(12) United States Patent
Kim et al.

(10) Patent No.: US 6,967,809 B2
(45) Date of Patent: Nov. 22, 2005

(54) METHOD AND APPARATUS PROVIDING SPIRAL SERVO CONTROL FOR SKEWLESS READ/WRITES IN A HARD DISK DRIVE

(75) Inventors: Gyu Taek Kim, Santa Clara, CA (US); YoungDug Jung, San Jose, CA (US); Yeong Kyun (John) Lee, San Jose, CA (US); Sang Hoon Chu, Santa Clara, CA (US)

(73) Assignee: Samsung Electronics Co., Ltd., Sunwon (KR)

( * ) Notice: Subject to any disclaimer, the term of this patent is extended or adjusted under 35 U.S.C. 154(b) by 318 days.

(21) Appl. No.: 10/202,780

(22) Filed: Jul. 24, 2002

(65) Prior Publication Data

US 2004/0017631 A1   Jan. 29, 2004

(51) Int. Cl.$^7$ .............................................. G11B 5/596
(52) U.S. Cl. .................................................. 360/78.04
(58) Field of Search ............................. 360/78.04, 75, 360/77.02, 77.07, 77.08, 77.11, 78.14, 78.12, 360/78.13

(56) References Cited

U.S. PATENT DOCUMENTS

| | | | |
|---|---|---|---|
| 5,619,387 A | * | 4/1997 | Ottesen et al. ........... 360/77.08 |
| 6,073,189 A | | 6/2000 | Bounsall et al. |
| 6,091,686 A | | 7/2000 | Caffarelli et al. |

\* cited by examiner

Primary Examiner—David Hudspeth
Assistant Examiner—Mitchell Slavitt
(74) Attorney, Agent, or Firm—Gregory Smith & Associates; Jeffrey P. Aiello; Earle Jennings

(57) ABSTRACT

The invention provides magnetic disks with the ability for consecutive tracks to be read or written continuously, removing the traversal of the gap between tracks which degrades bandwidth delivery performance. The invention includes a disk surface formatted with tracks, and sectors within these tracks, which vary in radius. The ending radius of a sector differs significantly from its starting radius. The ending radius of the last sector of one track is very close to the starting radius of its successor track, providing a spiral arrangement of tracks, each possessing a fixed number of sectors, and supporting continuous accessing of successive tracks.

26 Claims, 5 Drawing Sheets

METHOD AND APPARATUS PROVIDING SPIRAL SERVO CONTROL FOR SKEWLESS READ/WRITES IN A HARD DISK DRIVE

TECHNICAL FIELD

This invention relates to reading and writing sectors and tracks of hard disk drives.

BACKGROUND ART

Disk drives are an important data storage technology. Read-write heads are one of the crucial components of a disk drive, directly communicating with a disk surface containing the data storage medium.

FIG. 1A illustrates a typical prior art high capacity disk drive 10 including actuator arm 30 with voice coil 32, actuator axis 40, suspension or head arms 50–58 with slider/head unit 60 placed among the disks.

FIG. 1B illustrates a typical prior art high capacity disk drive 10 with actuator 20 including actuator arm 30 with voice coil 32, actuator axis 40, head arms 50–56 and slider/head units 60–66 with the disks removed.

Since the 1980's, high capacity disk drives 10 have used voice coil actuators 20–66 to position their read-write heads over specific tracks. The heads are mounted on head sliders 60–66, which float a small distance off the disk drive surface when in operation. Often there is one head per head slider for a given disk drive surface. There are usually multiple heads in a single disk drive, but for economic reasons, usually only one voice coil actuator.

Voice coil actuators are further composed of a fixed magnet actuator 20 interacting with a time varying electromagnetic field induced by voice coil 32 to provide a lever action via actuator axis 40. The lever action acts to move head arms 50–56 positioning head slider units 60–66 over specific tracks with speed and accuracy. Actuator arms 30 are often considered to include voice coil 32, actuator axis 40, head arms 50–56 and head sliders 60–66. Note that actuator arms 30 may have as few as a single head arm 50. Note also that a single head arm 52 may connect with two head sliders 62 and 64. Introduced in the 1990's, merged heads brought significant increases in areal density. A merged type head reads the disk surface using a spin valve. The spin valve contains a conductive thin film, whose resistance changes in the presence of a magnetic field. By separating the functions of writing and reading, each function can be optimized further than would be possible for the older read-write heads. For all the improvement that merged heads bring, there remain problems. However, before discussing these problems, consider first how and what controls these devices in contemporary disk drives.

Merged type heads possess different components for reading and writing, because the magneto-resistive effect only occurs during reading. A merged type head typically includes a thin film head and a spin valve sensor. The primary use of the thin film head is in the write process. The spin valve sensor is used for reading.

Merged Magneto-Resistive (MR) heads have several advantages over earlier approaches, which used a single component, for both read and write. Earlier read-write heads were a study in tradeoffs. The single component, often a ferrite core, can increase read sensitivity with additional windings around the core. However, these added windings make the ferrite core write less efficiently.

Introduced in the 1990's, merged heads brought significant increases in areal density. A merged type head reads the disk surface using a spin valve, containing a conductive thin film, whose resistance changes in the presence of a magnetic field. By separating the functions of writing and reading, each function can be optimized further than would be possible for the older read-write heads. For all the improvement that merged heads bring, there remain problems. However, before discussing these problems, consider first how and what controls these devices in contemporary disk drives.

FIG. 2A illustrates a suspended head slider 60 containing the MR read-write head 200 of the prior art, which is part of the actuator assembly as shown in FIGS. 1A–1B.

FIG. 2B illustrates a simplified schematic of a disk drive controller 1000. Disk drive controller 1000 controls an analog read-write interface 220 communicating resistivity found in the spin valve within MR read-write head 200. Disk drive controller 1000 concurrently controls servo-controller 240 driving voice coil 32 of the voice coil actuator to position merged read-write 200 to access a rotating magnetic disk surface 12 of the prior art.

Analog read-write interface 220 frequently includes a channel interface 222 communicating with pre-amplifier 224. Channel interface 222 receives commands setting at least the read_bias, write_bias, and thermal asperity detection threshold(s), denoted as TA_threshold in FIG. 2B.

Various disk drive analog read-write interfaces 220 may employ either a read current bias or a read voltage bias. By way of example, the resistance of the read head is determined by measuring the voltage drop (V_rd) across the read differential signal pair (r+and r−) based upon the read bias current setting read_bias, using Ohm's Law.

Control of the disk drive requires rapid and dynamic feedback and control of the voice coil 32, which is usually done by a servo controller 240, responding to commands from the embedded disk controller 1000. In some hard disk drives, the servo controller is physically part of the embedded disk controller. It has been illustrated as separate strictly to facilitate the subsequent discussion of the central features of the invention, and is not meant to imply a limitation of scope upon the claims.

The servo controller is given directions on where to position the read-write head 200 to access the rotating disk surface 12 of FIG. 1A. Merged read-write head 200 accesses data organized into tracks, each track containing several sectors. Because the disk surface is rotating, the positioning of the read-write head requires both an angular and radial positioning of the read-write head to access a sector of a track of the disk drive. Typically, servo controller 240 provides a head speed feedback driven control of voice coil 32 to position the read-write head 200 with respect to a rotating disk surface 12.

Historically, there have been two distinct traditions regarding the physical arrangement of data on a data storage surface, one dominated by audio storage and the other dominated by digital data storage. All magnetic disk drives, since the start of computing, have used a fixed radius for each track. Before discussing the invention, consider the history of the prior art.

FIG. 3A illustrates a spiral track as found in prior art technologies including phonograph records and compact disks.

Audio data storage employs a spiral track arrangement for storing data with a continuous spiral of data. The earliest audio storage technology using this approach was Edison's gramophone using cylinders, which went into production before the twentieth century. Early in the twentieth century, Edison and others put the disc phonograph into production.

The disc phonograph also used a spiral pattern for audio recording by mechanically accessing that pattern on a flat, rotating disc surface. A subsequent application of this approach is found in contemporary compact disks, which use an is optical method to access information again stored in a spiral arrangement on a rotating, flat surface.

FIG. 3B illustrates a circular track arrangement as found in random access, digital storage devices include all magnetically recorded disk drives.

Digital data storage begins with the first electronic computers by the early 1950's. Earliest versions of digital data storage used circular tracks magnetically recorded on drums, which were followed by the use of concentric, circular tracks magnetically recorded on rotating disk surfaces.

There were excellent reasons as to why these two distinct approaches evolved over the last several decades.

Audio data is by its nature sequential and often of indefinite length. By way of example, the movements of a symphony are not all of the same length, and each movement is specifically performed sequentially in time. The requirements for audio data storage are driven by these two facts, whether in Edison's laboratory, or in the audio compact disk of today. The spiral track recording arrangement is a great way to satisfy these requirements.

Data storage is driven by the needs of computers which have, since early in their evolution, stored information in databases and file management systems. These organization tools are predicated upon the ability to randomly access anywhere within a collection of data units, often known as sectors or records. To facilitate this approach, early computer manufacturers devised a distinctive approach, involving circular tracks, each containing a fixed number of sectors, which could be independently written. These sectors were then integrated into files and database objects, which were then further organized into directories, folders, and so on.

The requirement of computer-oriented digital data storage is to move freely throughout the stored data, modifying any record or sector at will, without excessive overhead to the whole. The circular track approach has proven to be reliable and has facilitated a revolution in computer storage technology.

Methods were invented for using compact disks to act like a disk drive by the late 1990's. These methods permit data to be written on compact disks, and then read in a fashion compatible with disk management systems such as found in contemporary operating systems. These methods employed the audio-based standard of using spiral tracks, recording a variable number of packets or sectors on each of these tracks. However, these methods were not designed to provide a random writing of a sector within a track, but rather to provide archival and offline storage capabilities.

It turns out that these traditional audio storage devices are incapable of being used as randomly written digital storage devices comparable to magnetic hard disk drives. These devices just cannot be easily written with random sequences of sectors.

While the magnetic disk drives have performed their task quite well, there is a persistent inefficiency associated with them. The read-write head must traverse a radial distance to go from one track to its successor. While traversing the gap between these tracks, no data can be accessed. The access bandwidth is essentially halted until the read-write head is again positioned over the successor track. The time to traverse the gap between successive tracks adds about 20% to the time it takes to access all the data on the track.

What is needed is a magnetic disk drive supporting the requirements of computing without halting access of successive tracks.

SUMMARY OF THE INVENTION

The invention addresses at least the stated needs unanswered by the prior art for computer compatible data storage, providing magnetic disks with the ability for consecutive tracks to be read or written continuously, removing the traversal of the gap between tracks. This adds about 20% to the bandwidth performance of magnetic disk drives.

The invention includes a disk surface formatted with tracks, and sectors within these tracks, which vary in radius. The ending radius of a sector differs significantly from its starting radius. The ending radius of the last sector of one track is very close to the starting radius of its successor track, providing a spiral arrangement of tracks, each possessing a fixed number of sectors.

The invention includes method of determining the starting and ending radius of a sector, positioning the read-write head with respect to the rotating disk surface to linearly vary the radial position from the start of the sector to its end. The invention further includes reading and writing sectors while positioning the read-write head in this fashion.

The invention includes formatting a disk surface by writing the sectors of each track in this fashion, as well as manufacturing disk drives by formatting their disk surfaces in this way. The invention includes the disk drives as well as the disk surfaces made in this fashion.

These and other advantages of the present invention will become apparent upon reading the following detailed descriptions and studying the various figures of the drawings.

DETAILED DESCRIPTION OF THE INVENTION

The invention addresses at least the stated needs unanswered by the prior art for computer compatible data storage, providing magnetic disks with the ability for consecutive tracks to be read or written continuously, removing the traversal of the gap between tracks. This adds about 20% to the bandwidth performance of magnetic disk drives.

The invention includes a disk surface formatted with tracks, and sectors within these tracks, which vary in radius. The ending radius of a sector differs significantly from its starting radius. The ending radius of the last sector of one track is very close to the starting radius of its successor track, providing a spiral arrangement of tracks, each possessing a fixed number of sectors.

Figure 1A:
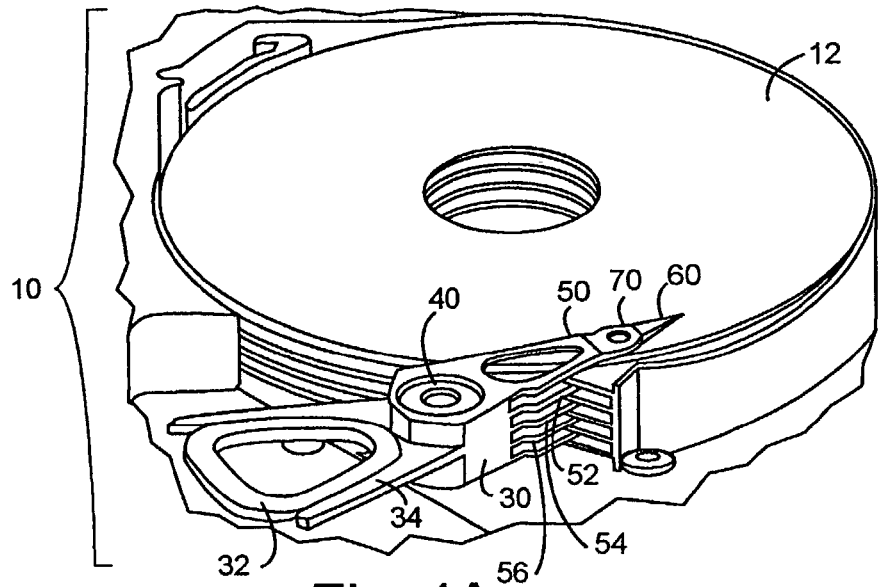
FIG. 1A illustrates a typical prior art high capacity disk drive 10 including actuator arm 30 with voice coil 32, actuator axis 40, suspension or head arms 50–58 with slider/head unit 60 placed among the disks.
Figure 1B:
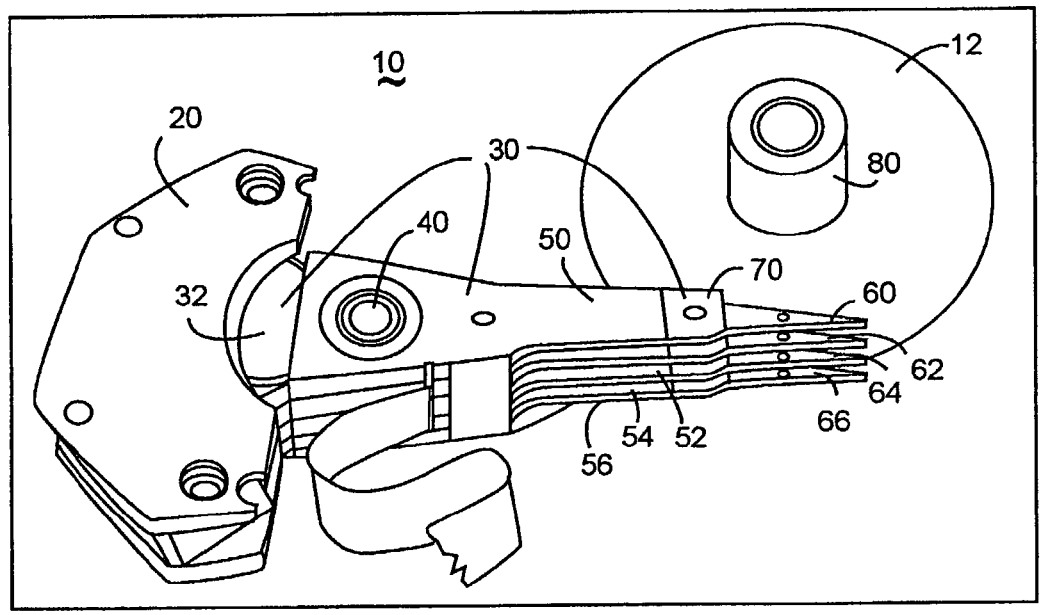
FIG. 1B illustrates a typical prior art high capacity disk drive 10 with actuator 20 including actuator arm 30 with voice coil 32, actuator axis 40, head arms 50–56 and slider/head units 60–66 with the disks removed.
Figure 2A:
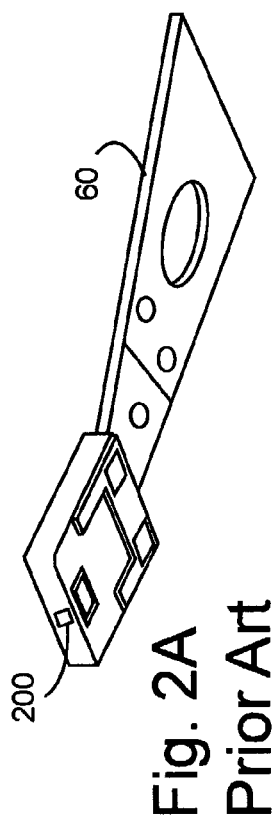
FIG. 2A illustrates a suspended head slider 60 containing the MR read-write head 200 of the prior art, which is part of the actuator assembly as shown in FIGS. 1A–1B.
Figure 2B:
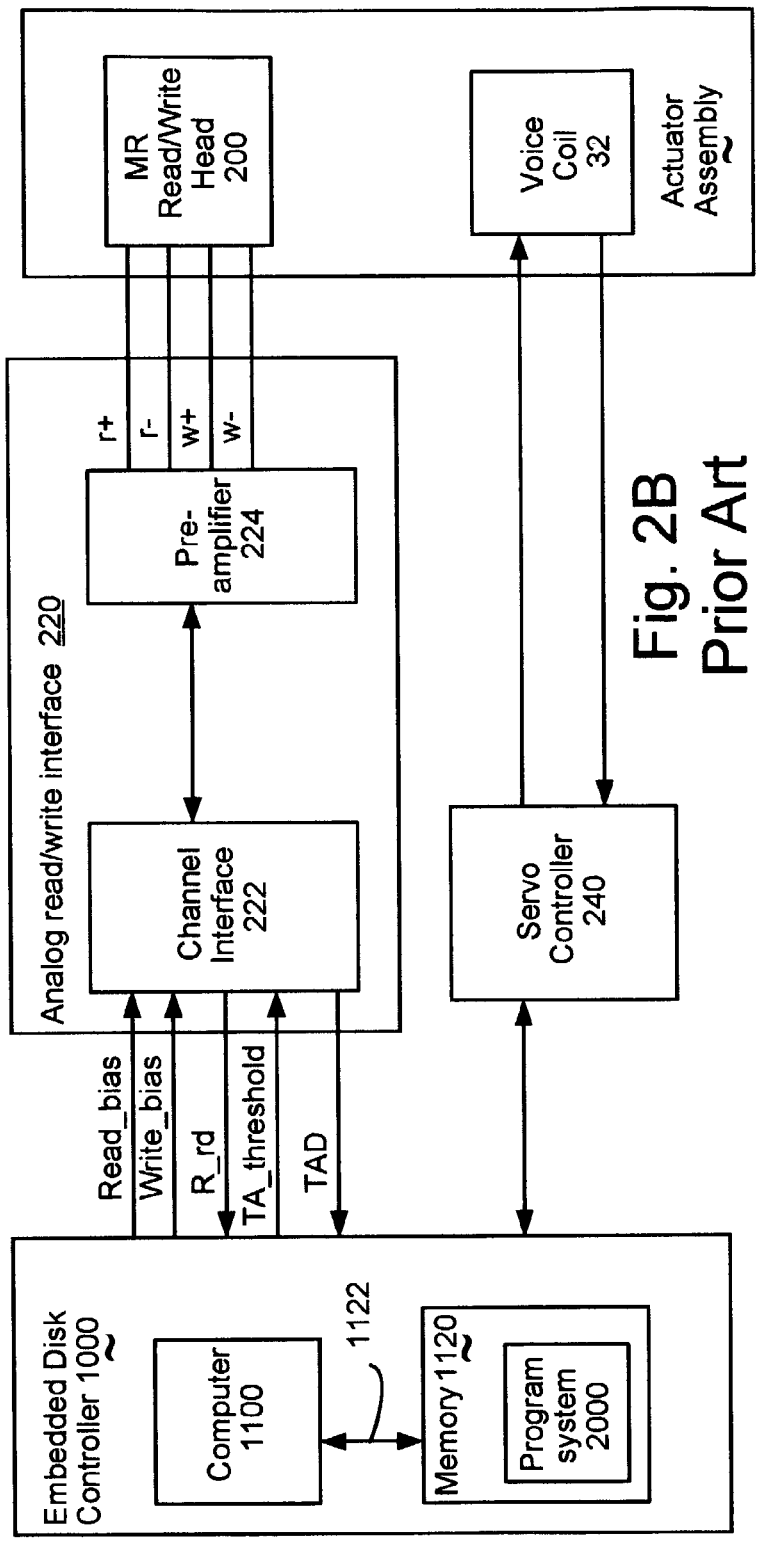
FIG. 2B illustrates a simplified schematic of a disk drive controller 1000 controlling an analog read-write interface 220 communicating with MR read-write head 200, as well as servo-controller 240, driving voice coil 32, to position merged read-write 200 to access a rotating magnetic disk surface 12 of the prior art.
Figure 3A:
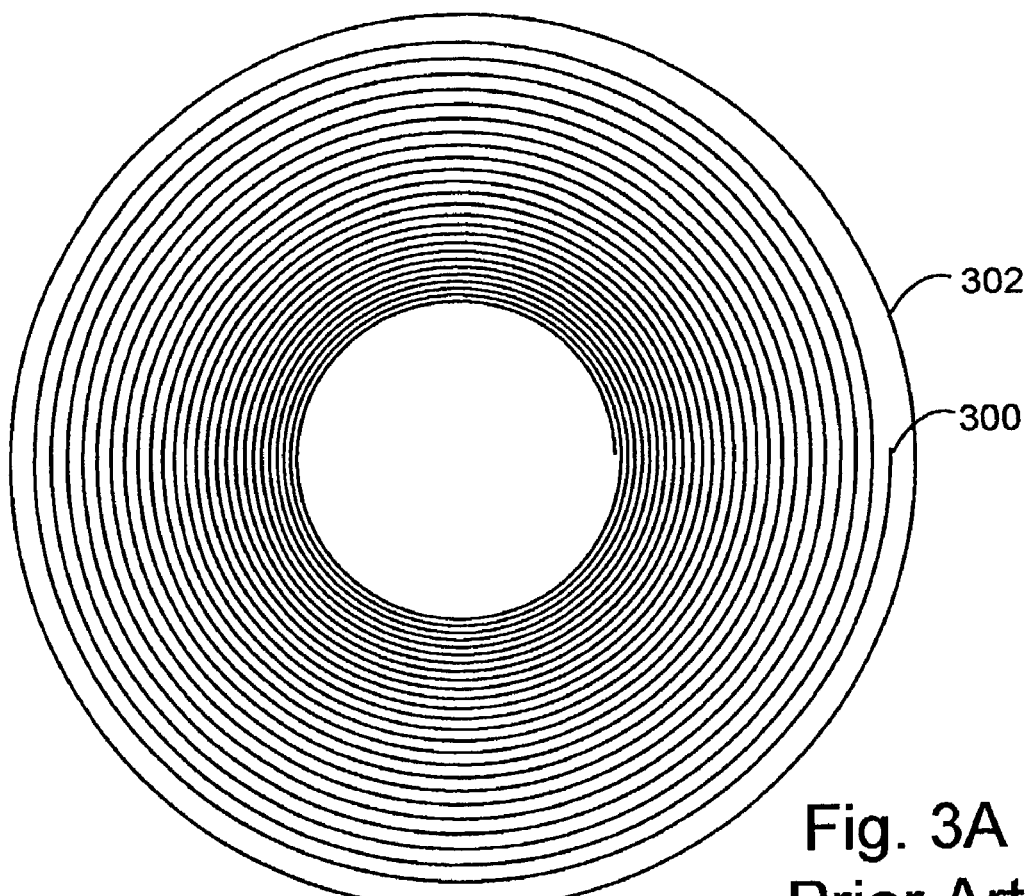
FIG. 3A illustrates a spiral track as found in prior art technologies including phonograph records and compact disks.
Figure 3B:
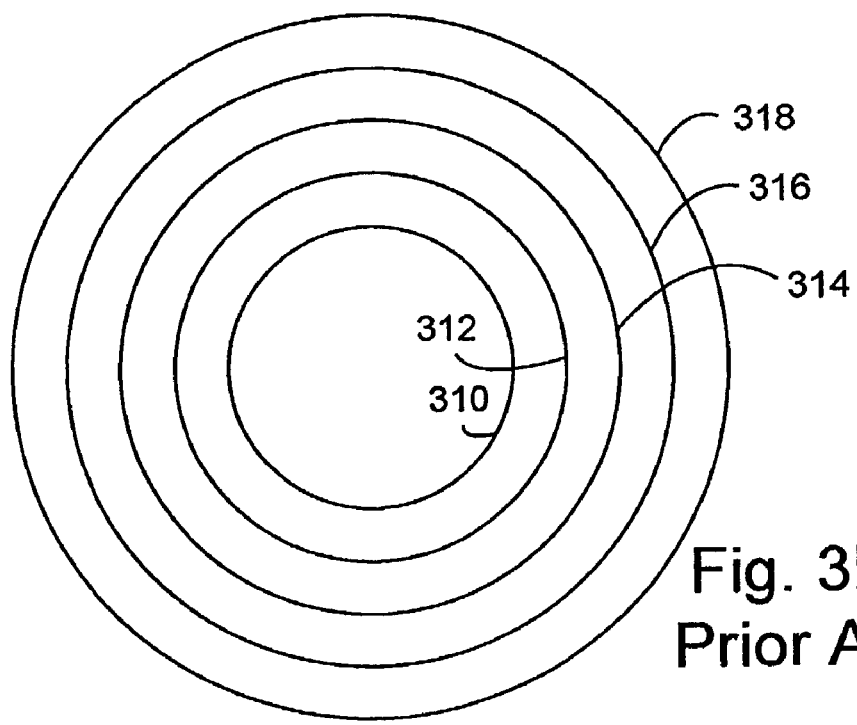
FIG. 3B illustrates a circular track arrangement as found in random access, digital storage devices include all magnetically recorded disk drives.
Figure 4A:
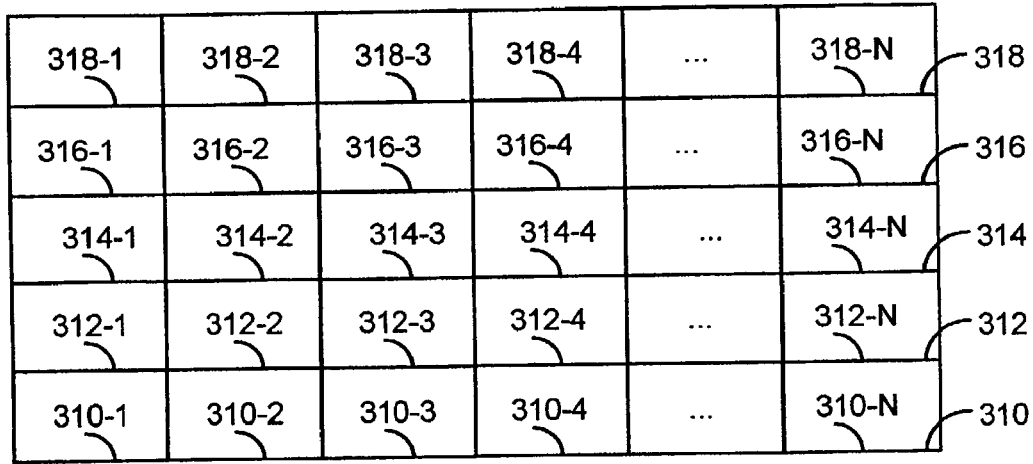
FIG. 4A illustrates the physical arrangement of sectors within circular tracks of a prior art magnetic disk drive.

FIG. 4A illustrates the physical arrangement of sectors within circular tracks of a prior art magnetic disk drive.

The disk surface contains a succession of circular tracks 310–318, each containing a succession of sectors 310-1 to 310-N. The horizontal axis represents the angular relationship of the sectors of a track on the disk surface. The vertical axis represents the radial relationship between successive tracks, showing that successive tracks have a gap which must be traversed by the read-write head to access successive tracks.

Figure 4B:
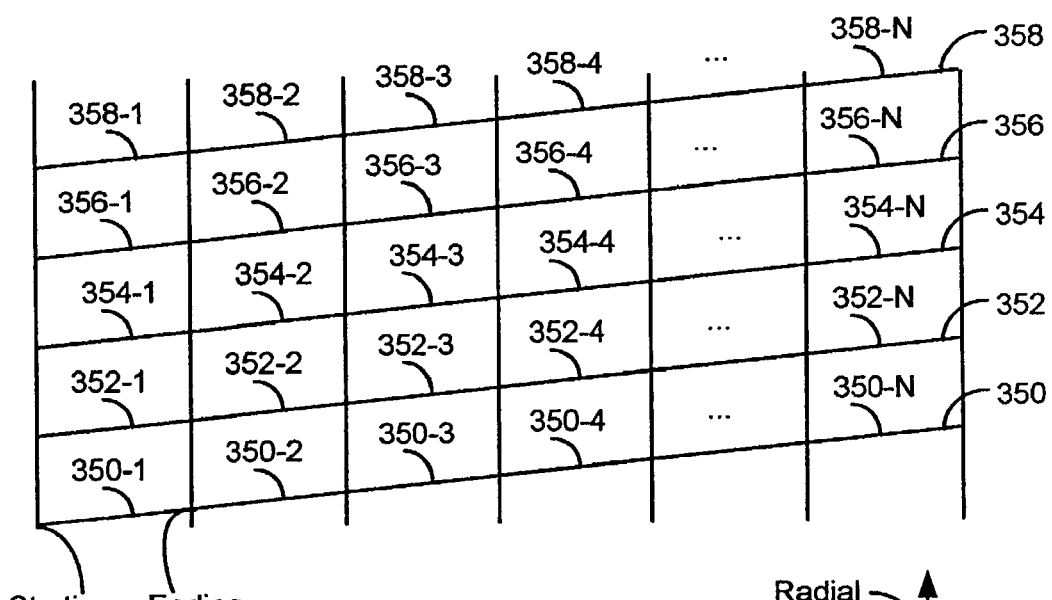
FIG. 4B illustrates the invention physically arranging a succession of tracks on a disk surface, each track with multiple sectors, each sector possessing a starting radius significantly differing from its ending radius.

FIG. 4B illustrates the invention physically arranging a succession of tracks on a disk surface, each track with multiple sectors, each sector possessing a starting radius significantly differing from its ending radius.

FIG. 4B further illustrates that the ending radius of the last sector of a track is very close, if not identical to, the starting radius of the successor track. This arrangement effectively eliminates the gap between successive tracks, allowing the access time to incur little or no overhead in accessing successive tracks. The inventors believe that existing servo-controllers and voice coil actuators can reliably support this method and arrangement, providing a 20% improvement in bandwidth delivery for accesses to successive tracks.

In the following figures is a flowchart of various methods of the invention, possessing arrows with reference numbers. These arrows will signify of flow of control, and sometimes data, supporting implementations including at least one program step or program thread executing upon a computer, inferential links in an inferential engine, state transitions in a finite state machine, and dominant learned responses within a neural network.

The operation of starting the flowchart refers to at least one of the following. Entering a subroutine in a macro instruction sequence in a computer. Entering into a deeper node of an inferential graph. Directing a state transition in a finite state machine, possibly while pushing a return state. And triggering a collection of neurons in a neural network.

The operation of termination in the flowchart refers to at least one or more of the following. The completion of those operations, which may result in a subroutine return, traversal of a higher node in an inferential graph, popping of a previously stored state in a finite state machine, return to dormancy of the firing neurons of the neural network.

A computer as used herein will include, but is not limited to an instruction processor. The instruction processor includes at least one instruction processing element and at least one data processing element, each data processing element controlled by at least one instruction processing element.

Figure 5:
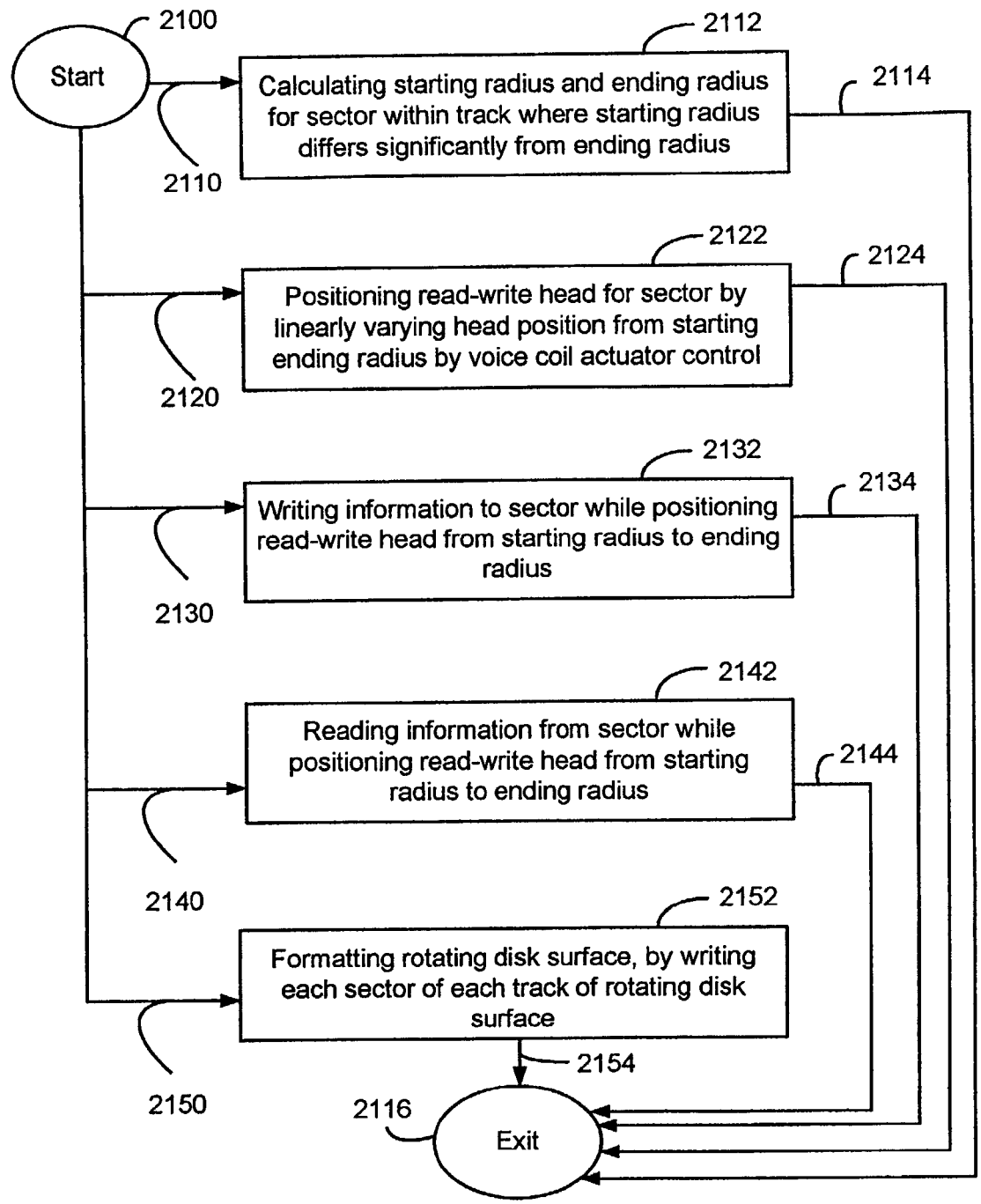
FIG. 5 illustrates various aspects of the inventive method 2100 positioning a merged read-write head 200 accessing a disk surface 12, through control of a voice coil 32 of an actuator containing read-write head 200, as illustrated in FIGS. 1A, 1B, 2A and 2B.

FIG. 5 illustrates various aspects of the inventive method 2100 positioning a read-write head 200 accessing a disk surface 12 through control of a voice coil 32 of an actuator containing read-write head 200 as illustrated in FIGS. 1A, 1B, 2A and 2B.

Operation 2112 performs calculating a starting radius and an ending radius for one of the sectors within one of the tracks where the starting radius differs significantly from the ending radius.

Operation 2122 performs positioning the read-write head for the sector of the track by linearly varying the read-write head position from the starting radius to the ending radius through control of the voice coil actuator.

Operation 2132 performs writing the information to the sector of the track while performing the step 2122 of positioning the read-write head from the starting radius to the ending radius.

Operation 2142 performs reading the information from the sector of the track while performing the step 2122 of positioning the read-write head from the starting radius to the ending radius.

Operation 2152 performs formatting the rotating disk surface, by writing each of the sectors of the track to each of the tracks of the rotating disk surface using the operations 2112, 2122 and 2132.

Note that the embedded controller using this invention may further include a servo-controller, which may involve a separate instruction processor controlling a separate data processor. The servo controller may be implemented as a finite state machine. The system including both the embedded controller and the servo-controller is considered in the means for implementing these operations.

Note that the invention includes test instruments, methods, repair, and manufacturing equipment, calculating as well as positioning for distinct starting and ending radii of sectors, as well as writing and reading such sectors.

The preceding embodiments have been provided by way of example and are not meant to constrain the scope of the following claims.

What is claimed is:

1. A disk drive controlling the position of a read-write head communicatively coupled to a rotating disk surface by a voice coil actuator containing said read-write head, further comprising:
    means for formatting said disk surface, further comprising, for each of said tracks of said rotating disk surface, and for each of said sectors of said track:
        means for calculating a starting radius and an ending radius for said sector within said track; wherein said starting radius differs significantly from said ending radius; and
        means for positioning said read-write head by linearly varying said read-write head position from said starting radius to said ending radius through control of said voice coil actuator; and
        means for writing said information to said sector of said track while performing the step positioning said read-write head from said starting radius to said ending radius;
    wherein said rotating disk surface includes an ordered sequence of said tracks, and each of said tracks of said rotating disk surface includes an ordered sequence of said sectors;

wherein any of said ordered sequences possesses a first member, and a last member;
wherein for any of said ordered sequences, any member of said ordered sequence which is not the last member possesses a successor member;
wherein for each of said tracks of said rotating disk surface having a successor track, said ending radius of said last member of said sector sequence for said track is very close to said starting radius of said first sector sequence member of said successor track.

2. The apparatus of claim 1, further comprising:
means for calculating a starting radius and an ending radius for said sector within said track; wherein said starting radius differs significantly from said ending radius; and
means for positioning said read-write head by linearly varying said read-write head position from said starting radius to said ending radius through control of said voice coil actuator.

3. The apparatus of claim 2, further comprising:
means for writing said information to said sector of said track while performing the step positioning said read-write head from said starting radius to said ending radius; and
means for reading said information from said sector of said track while performing the step position said read-write head from said starting radius to said ending radius.

4. The apparatus of claim 1,
wherein at least one of said means is implemented by at least one member of a collection comprising a computer, a finite state machine, an inferential engine, and a neural network;
wherein said computer concurrently executes at least one instruction directing at least one datapath to provide at least part of said means.

5. The apparatus of claim 1, wherein said disk drive is a hard disk drive.

6. A method of controlling the position of a read-write head communicatively coupled to a rotating disk surface by a voice coil actuator containing said read-write head, comprising the step of:
formatting said disk surface, further comprising, for each of said tracks of said rotating disk surface, and for each of said sectors of said track, the steps of:
calculating a starting radius and an ending radius for said sector within said track;
wherein said starting radius differs significantly from said ending radius; and
positioning said read-write head by linearly varying said read-write head position from said starting radius to said ending radius through control of said voice coil actuator; and
writing said information to said sector of said track while performing the step positioning said read-write head from said starting radius to said ending radius;
wherein said rotating disk surface includes an ordered sequence of said tracks, and each of said tracks of said rotating disk surface includes an ordered sequence of said sectors;
wherein any ordered sequence possesses a first member, and a last member;
wherein for any ordered sequence, any member of said ordered sequence which is not the last member possesses a successor member;
wherein for each of said tracks of said rotating disk surface having a successor track, said ending radius of said last member of said sector sequence for said track is very close to said starting radius of said first sector sequence member of said successor track.

7. The method of claim 6, further comprising the steps of:
calculating a starting radius and an ending radius for one of said sectors within one of said tracks; wherein said starting radius differs significantly from said ending radius; and
positioning said read-write head for said sector of said track by linearly varying said read-write head position from said starting radius to said ending radius through control of said voice coil actuator.

8. The method of claim 7, further comprising the steps of:
writing said information to said sector of said track while performing the step positioning said read-write head from said starting radius to said ending radius; and
reading said information from said sector of said track while performing the step position said read-write head from said starting radius to said ending radius.

9. A method manufacturing a disk drive, comprising the steps of formatting a disk surface of claim 6.

10. Said disk drive as a product of the process of claim 9.

11. The method of claim 9, wherein said disk drive is a hard disk drive.

12. Said disk surface as a product of the process of formatting said disk surface of claim 6.

13. A method of operating a hard disk drive positioning a voice coil actuator driven, read-write head at a sector within a track of a rotating disk surface communicatively coupled with said read-write head to access information in said sectors of said track of said rotating disk surface, comprising the steps of:
calculating a starting radius and an ending radius for said sector within said track; wherein said starting radius differs significantly from said ending radius;
positioning said read-write head by linearly varying said read-write head position from said starting radius to said ending radius through control of said voice coil actuator;
writing said information to said sector of said track while performing the step positioning said read-write head from said starting radius to said ending radius; and
reading said information from said sector of said track while performing the step position said read-write head from said starting radius to said ending radius.

14. The method of claim 13,
wherein said rotating disk surface includes an ordered sequence of said tracks, and each of said tracks of said rotating disk surface includes an ordered sequence of said sectors;
wherein any of said ordered sequences possesses a first member, and a last member;
wherein for any of said ordered sequences, any member of said ordered sequence which is not the last member possesses a successor member;
wherein for each of said tracks of said rotating disk surface having a successor track, said ending radius of said last member of said sector sequence for said track is very close to said starting radius of said first sector sequence member of said successor track.

15. The method of claim 14, further comprising the step of:
formatting said rotating disk surface, further comprising, for each of said tracks of said rotating disk surface, and for each of said sectors of said track, the steps of:
calculating a starting radius and an ending radius for said sector within said track;

wherein said starting radius differs significantly from said ending radius; and positioning said read-write head by linearly varying said read-write head position from said starting radius to said ending radius through control of said voice coil actuator; and writing said information to said sector of said track while performing the step positioning said read-write head from said starting radius to said ending radius.

16. A manufacturing method for a disk drive, comprising the steps of formatting a disk surface of claim 15.

17. Said disk drive as a product of the process of claim 16.

18. Said rotating disk surface as a product of the process of formatting said disk surface of claim 15.

19. A program system comprising program steps residing in a memory accessibly coupled with a computer implementing the steps of claim 13.

20. The method of claim 13, further comprising the step of:

testing at least one member of a collection comprising said rotating disk surface, said voice coil actuator, said read-write head, and a disk drive comprising said rotating disk surface, said voice coil actuator and said read-write head.

21. An apparatus positioning a voice coil actuator driven, read-write head of a disk drive at a sector within a track of a rotating disk surface communicatively coupled with said read-write head, comprising:

means for calculating a starting radius and an ending radius for said sector within said track; wherein said starting radius differs significantly from said ending radius;

means for positioning said read-write head by linearly varying said read-write head position from said starting radius to said ending radius through control of said voice coil actuator;

means for writing said information to said sector of said track while performing the step positioning said read-write head from said starting radius to said ending radius; and means for reading said information from said sector of said track while performing the step position said read-write head from said starting radius to said ending radius.

22. The apparatus of claim 21, wherein said rotating disk surface includes an ordered sequence of tracks, and each of said tracks of said rotating disk surface includes an ordered sequence of sectors;

wherein any ordered sequence possesses a first member, and a last member;

wherein for any ordered sequence, any member of said ordered sequence which is not the last member possesses a successor member;

wherein for each of said tracks of said rotating disk surface having a successor track, said ending radius of said last member of said sector sequence for said track is very close to said starting radius of said first sector sequence member of said successor track.

23. The apparatus of claim 22, further comprising:

means for formatting said disk surface, further comprising, for each of said tracks of said rotating disk surface, and for each of said sectors of said track, the steps of:

means for calculating a starting radius and an ending radius for said sector within said track; wherein said starting radius differs significantly from said ending radius; and means for positioning said read-write head by linearly varying said read-write head position from said starting radius to said ending radius through control of said voice coil actuator; and means for writing said information to said sector of said track while performing the step positioning said read-write head from said starting radius to said ending radius.

24. The apparatus of claim 21, wherein at least one of said means is implemented by at least one member of a collection comprising a computer, a finite state machine, an inferential engine, and a neural network;

wherein said computer concurrently executes at least one instruction directing at least one datapath to provide at least part of said means.

25. The apparatus of claim 21, further comprising:

means for testing at least one member of a collection comprising said rotating disk surface, said voice coil actuator, said read-write head, and a disk drive comprising said rotating disk surface, said voice coil actuator and said read-write head.

26. The apparatus of claim 21, wherein said disk drive is a hard disk drive.

* * * * *